United States Patent [19]

Sahagian

[11] 3,737,175
[45] June 5, 1973

[54] SAFETY APPARATUS FOR AUTOMOBILES

[76] Inventor: Edward H. Sahagian, 67 Chester St., Arlington, Mass. 02174

[22] Filed: June 18, 1971

[21] Appl. No.: 154,472

[52] U.S. Cl. ................................................280/150 B
[51] Int. Cl. ...............................................B60r 21/02
[58] Field of Search........................280/150 B, 150 SB

[56] References Cited

UNITED STATES PATENTS

| | | | |
|---|---|---|---|
| 3,279,817 | 10/1966 | Henry | 280/150 B |
| 2,923,558 | 2/1960 | Groenewegen | 280/150 B |
| 2,923,559 | 2/1960 | Owens | 280/150 B |
| 3,105,702 | 10/1963 | Larson | 280/150 B |
| 2,740,642 | 4/1956 | Atwood | 280/150 SB |

FOREIGN PATENTS OR APPLICATIONS

| | | | |
|---|---|---|---|
| 1,115,600 | 10/1961 | Germany | 280/150 B |
| 964,471 | 5/1957 | Germany | 280/150 B |
| 848,310 | 1/1953 | Germany | 280/150 B |

*Primary Examiner*—Leo Friaglia
*Attorney*—Harold E. Cole

[57] ABSTRACT

Safety apparatus for autos has a yieldable, protective member forward of an automobile seat and which a passenger seated thereon will strike when thrown forward, as in a collision or sudden stop. Mechanism attaches said bar, when it is in front of the driver, to the steering post of an auto, or when it is on front of a back seat passenger it is attached to an upstanding emergency support fixed to the auto frame.

4 Claims, 6 Drawing Figures

PATENTED JUN 5 1973 3,737,175
SHEET 1 OF 2

INVENTOR.
Edward H. Sahagian

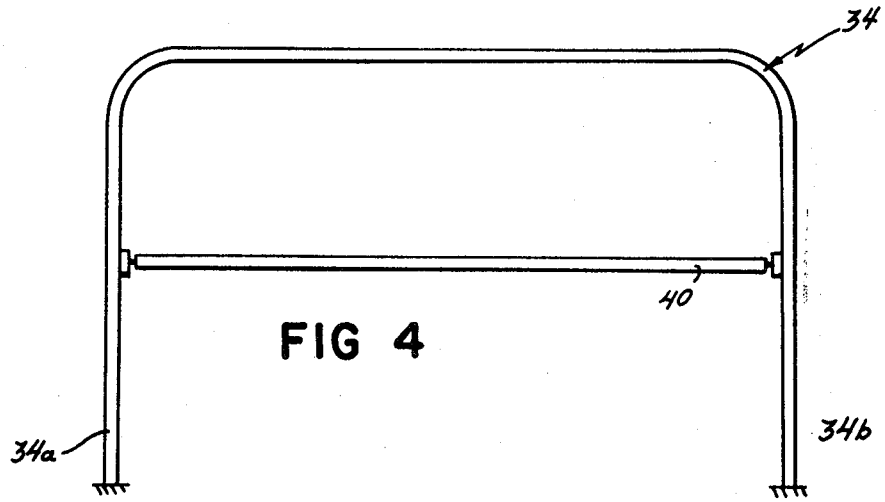
FIG 4
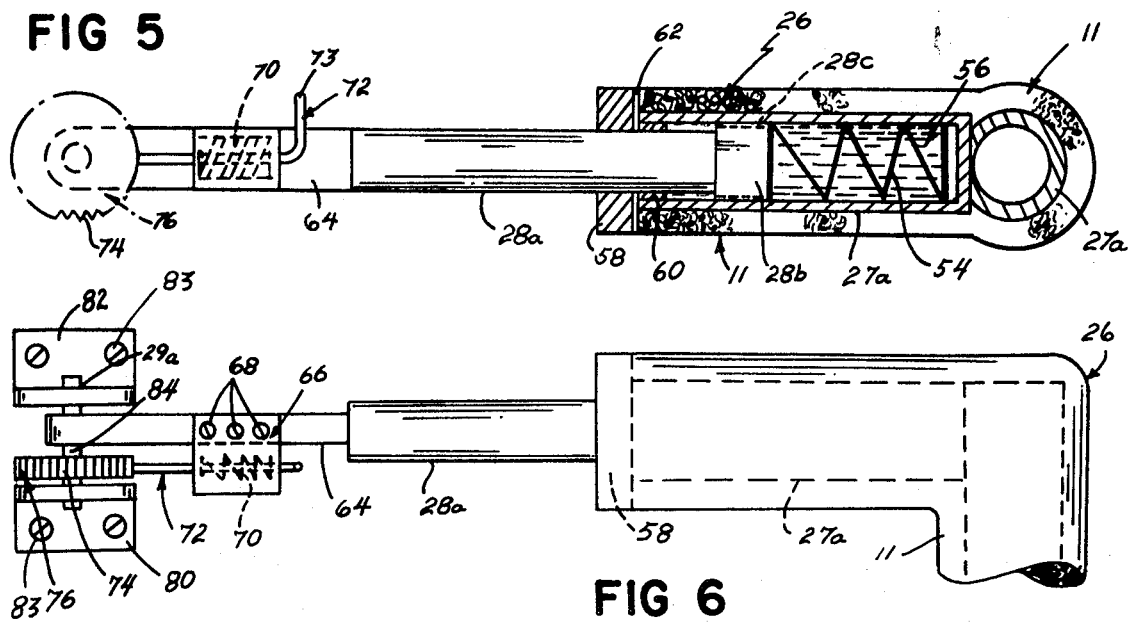
FIG 5
FIG 6
INVENTOR.
Edward H. Sahagian

SAFETY APPARATUS FOR AUTOMOBILES

My principal object is to provide a simplified protective member that is readily attachable to an automobile, and which will yield when a passenger is forcibly thrown against it, thus saving the latter from injury that he would otherwise suffer. A further object is to provide separate protective means for the auto driver of extreme simplicity.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my invention.

FIG. 4 is a front elevational view of a roll-over protector bar and showing a protective member attached thereto.

FIG. 5 is a side elevational view, partly in section, showing resilient mechanism to soften the force of impact when a passenger is forcible thrown forward into contact with my apparatus.

FIG. 6 is a top plan view of the mechanism shown in said FIG. 5.

Figure 2:
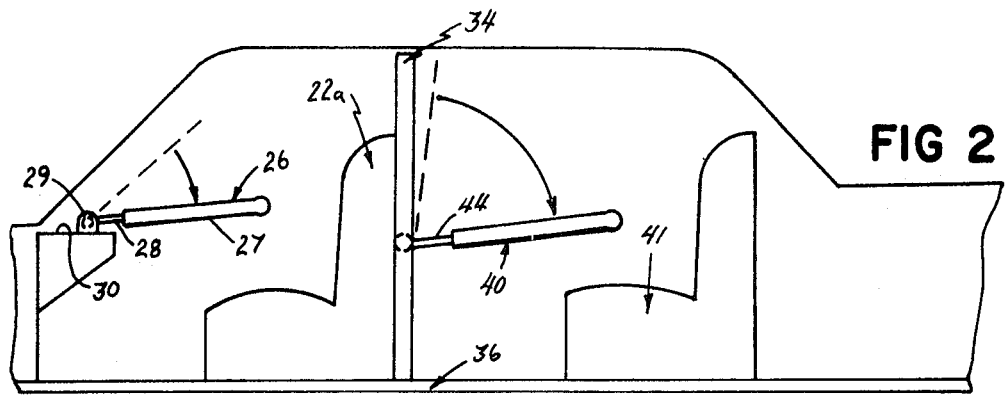
FIG. 2 is a diagrammatic view showing one part of my safety apparatus attached to the front passenger seat and another part attached to a roll-over upright protector bar.
Figure 1:
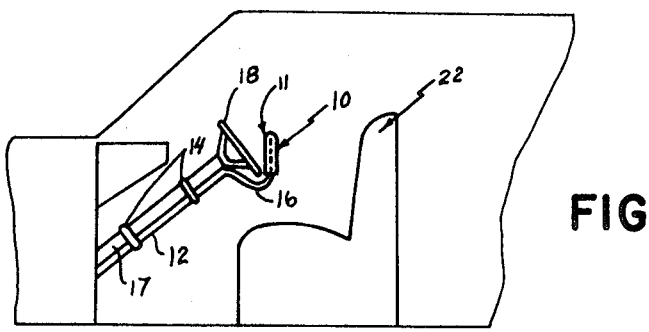
FIG. 1 is a diagrammatic view showing my safety apparatus attached to the steering column of an automobile.
Figure 3:
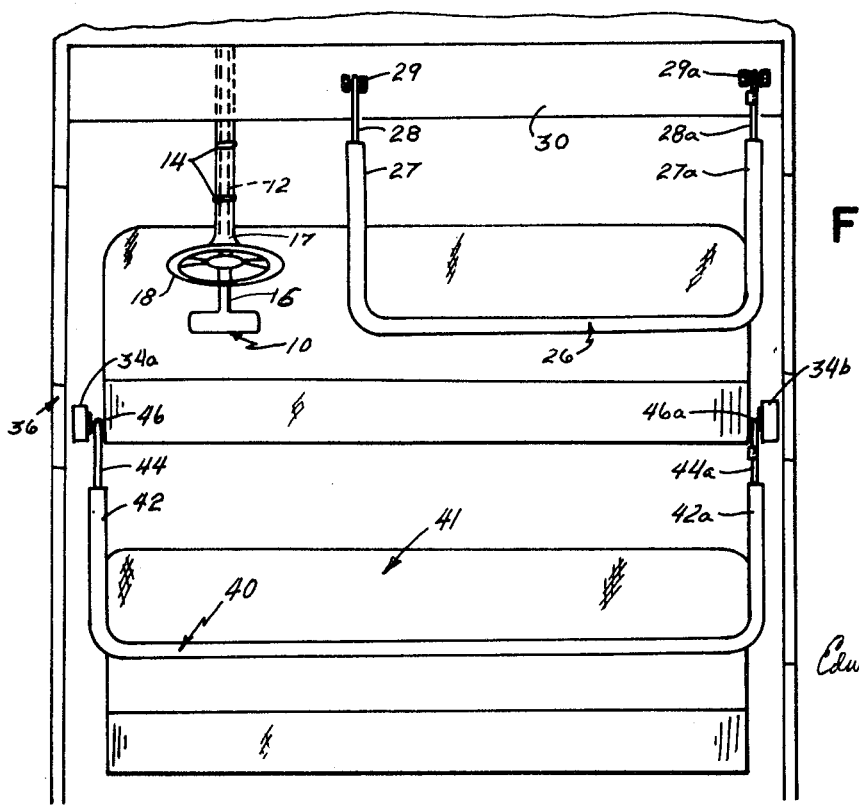
FIG. 3 is a top plan view of an automobile showing my apparatus attached thereto for protection of the driver, the front seat passengers and rear seat passengers.

As illustrated, my apparatus has a protective bar 10, preferably padded at the front with resilient material 11 such as foam rubber, and extending laterally. As shown in FIG. 1 an attaching rod 12 extends parallel with a steering column of an automobile, being attached thereto by well-known clamps or straps 14. Said attaching rod 12 has a resilient offset portion 16, which may be made of spring steel, that extends laterally and then upwardly to said bar 10. The latter is position of use, is in front of a steering wheel 18 of an auto. It is spaced somewhat from said wheel to avoid interfering with the use of the latter.

At the passenger side 22a of the front seat 22 is a protective bar 26 extending laterally, that preferably is U-shaped, having hollow arms 27 and 27a and having guide rods 28 and 28a that respectively extend into said arms, thus permitting movement of said bar 26 forward when forcibly contacted by passengers sitting on the front seat. Said rods 28 and 28a are pivotally connected to pivot means 29 and 29a attached to the dash 30 of an automobile, hence said protective bar 26 may be swung upwardly and forwardly out of the way when a passenger enters or alights form an auto.

Said auto is preferably provided with a well-known roll-over, upright support 34, preferably U-shaped, for the safety of passengers should the auto accidentally roll over. This upright protector 34 has two supporting legs 34a and 34b which may be welded to an auto frame 36, or otherwise attached.

A protective device 40, preferably U-shaped, is provided for passengers sitting on a rear seat 41, and which has two hollow arms 42 and 42a into which guide rods 44 and 44a extend thus permitting forward movement of said device 40 similar to the movement of said bar 26. Extending angularly outward from said rods 44 and 44a are short shafts or pivot members, 46 and 46a that are respectively pivoted in said upright support legs 34a and 34b, thus permitting rotative or swing-away movement of said device 40 similar to the movement of said bar 26.

Resilient mechanism useful for passengers sitting on the front seat, may be provided in association with said arms 27 and 27a and said rods 28 and 28a, including a coil spring 54 within each said arm 27 and 27a. Only the mechanism connected to one said arm, which is 27a, is described since that in the other arm 27 will be a duplicate. Said coil spring 54 bears on a head or wider portion 28b of said rod 28a. Said head 28b has holes 28c therethrough to permit movement of oil or other liquid 56, thus to serve as a shock absorbing fluid as it moves about said hollow arm 27a, the latter being less than full. An end closure plug 58 has screw threads 60 that connect with said hollow arm 27a, and a gasket 62 seals said liquid 56 in said arm 27a.

Locking mechanism for my apparatus hasan extension rod 64 that continues and rod 28a, and a small housing 66 is attached thereto by screws 68 that enter said extension rod 64. A coil spring 70 in said housing 66 connects with a release pin 72, having a handle 73, and that passes through said housing 66. This pin makes contact with teeth 74 that are part of a ratchet wheel 76. Two right angle brackets 80 and 82 spaced laterally apart are fastened to said dash 30 by screws 83. A rod supporting pin 84 extends through and is fixed to said bracket 80, ratchet wheel 76 and said bracket 82.

Movement of said protective bar 26 upwardly or downwardly carries said locking mechanism, said said pin contacts the ratchet wheel or whatever point is opposite it. This in turn depends upon the position taken by said protective bar 26 when a passenger is in the auto. It naturally will be more elevated in a person who is relatively tall.

Normally said rod 28a with said extension 64 and said release pin 72 are in the position shown in said FIGS. 5 and 6. However, when a passenger prepares to leave the auto he releases said pin 72 by movement of said handle 73 to free the pin from the ratchet wheel. Then said bar 26 is swung upwardly by pivoting movement of said rod extension 64 on said pin 84. Upon a passenger taking a seating position he draws said bar 26 downwardly and said pin 72, being released, will contact the ratchet wheel, in the desired position, and the bar 26 will remain in said position.

What I claim is:

1. Safety apparatus for automobiles comprising a protective bar extending laterally in position of use, and an attaching rod having an integral, resilient, offset portion extending laterally from the adjoining portion of said rod, and then upwardly, in position of use, and joining said bar, said rod being adapted to be attached to the steering column of an automobile.

2. Safety apparatus as of claim 1, said rod at said adjoining portion and said offset portion extending in the same vertical plane, said bar extending angularly and laterally from said offset portion.

3. In combination with an automobile having a steering column and a steering wheel, a protective bar and attaching rod therefor, said rod having an elongated portion extending upwardly and secured along the length of the steering column to a position just below the steering wheel and then joining an integral offset portion extending outward away from the steering column towards the driver's seat and then curving upwardly to a position spaced from and above the steering wheel, said protective bar being joined to the upper end of said rod and extending laterally above the steering wheel from a position directly opposite said wheel so as to be interposed between the wheel and driver.

4. Safety apparatus as of claim 3, said rod extending straight and parallel with said steering column.

* * * * *